Dec. 24, 1968  B. W. RAU  3,418,035
ADJUSTABLE MULTI-POWER STEREOSCOPE WITH COLLAPSIBLE SUPPORT
Filed Jan. 31, 1968  5 Sheets-Sheet 1

Inventor
Bert W. Rau
Dominik, Stein & Knechtel
Atty's

Dec. 24, 1968          B. W. RAU          3,418,035
ADJUSTABLE MULTI-POWER STEREOSCOPE WITH COLLAPSIBLE SUPPORT
Filed Jan. 31, 1968          5 Sheets-Sheet 2
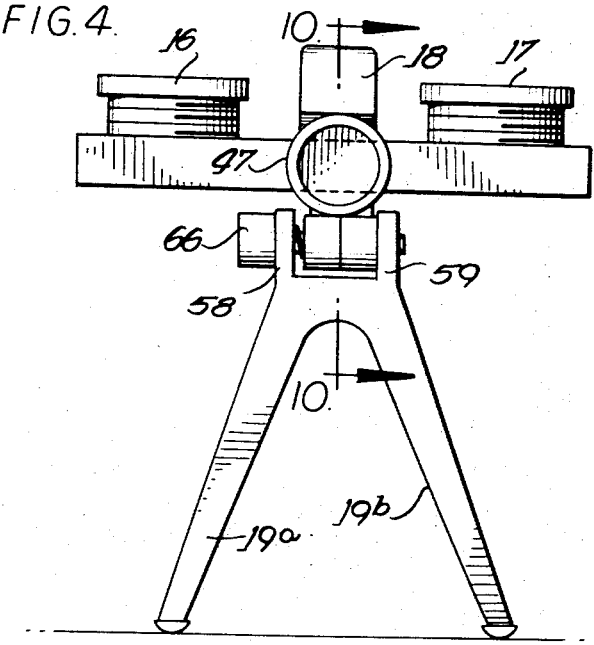

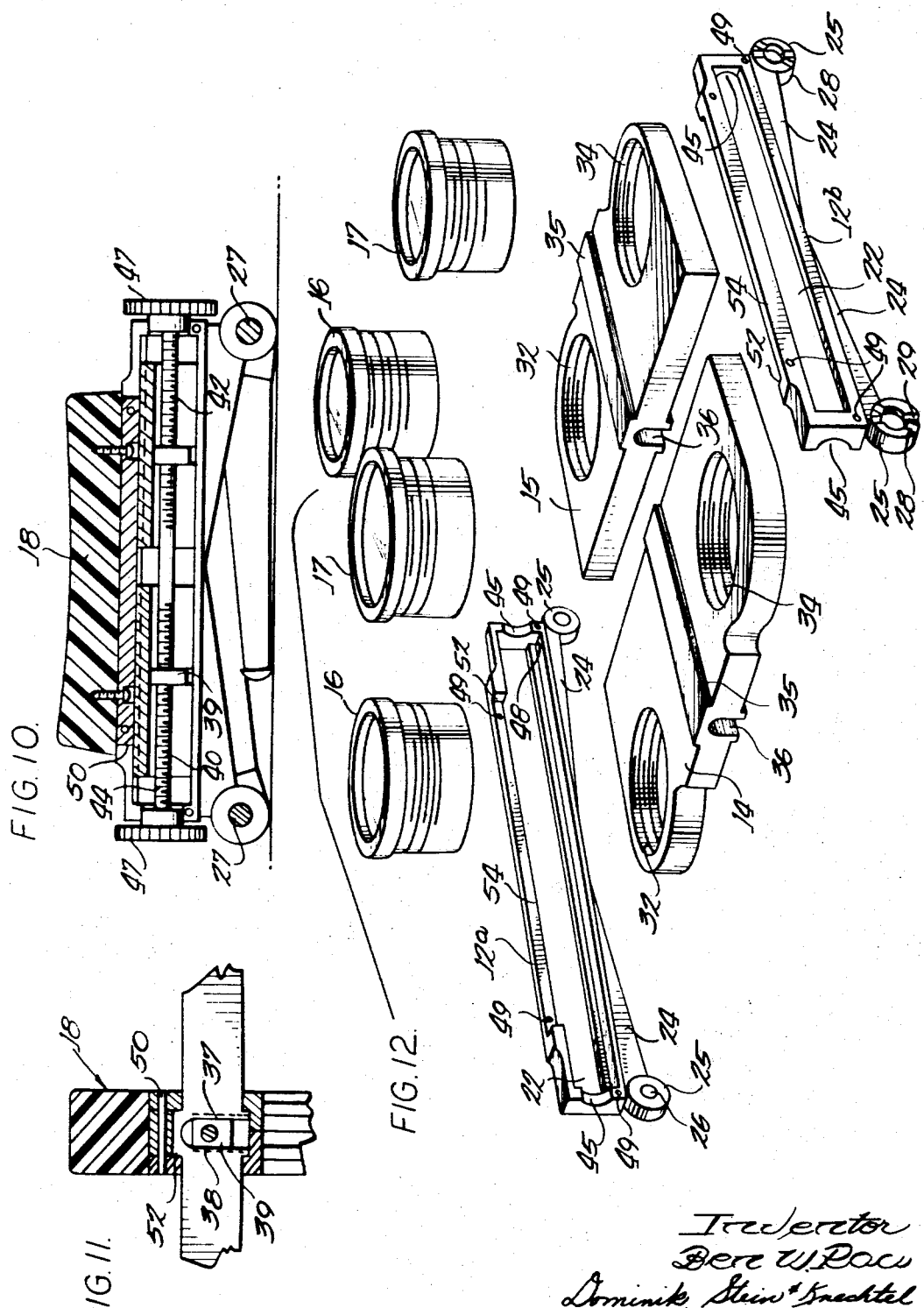

Dec. 24, 1968  B. W. RAU  3,418,035
ADJUSTABLE MULTI-POWER STEREOSCOPE WITH COLLAPSIBLE SUPPORT
Filed Jan. 31, 1968  5 Sheets-Sheet 4

INVENTOR.
BEN W. RAU
BY Dominik, Stein &
Knechtel
ATTY'S

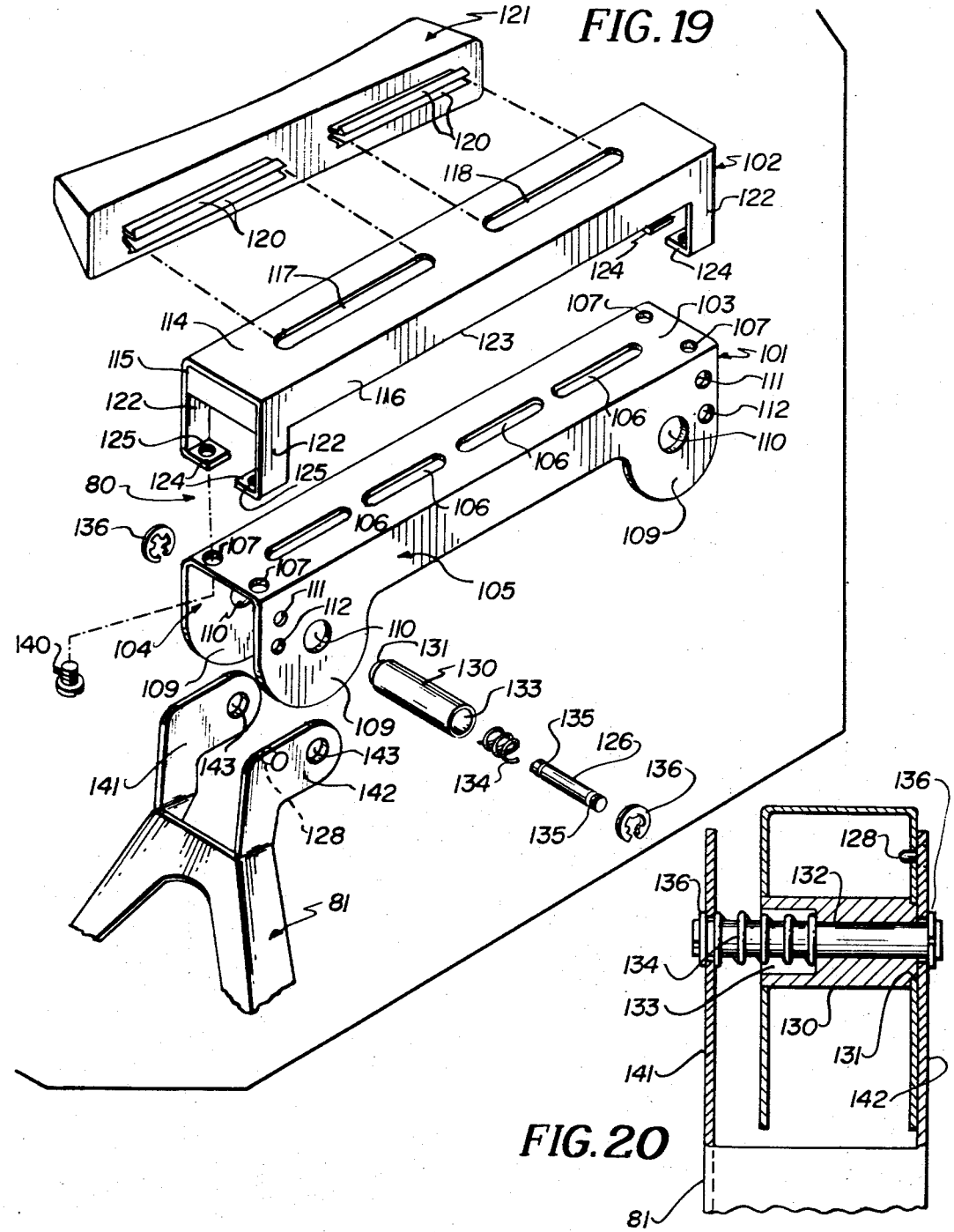

United States Patent Office
3,418,035
Patented Dec. 24, 1968

1

3,418,035
ADJUSTABLE MULTI-POWER STEREOSCOPE
WITH COLLAPSIBLE SUPPORT
Ben W. Rau, 1535 Knollwood, Highland Park, Ill. 60035
Continuation-in-part of application Ser. No. 569,516,
Aug. 1, 1966. This application Jan. 31, 1968, Ser.
No. 702,067
10 Claims. (Cl. 350—139)

ABSTRACT OF THE DISCLOSURE

A multi-power stereoscope including a body portion having a pair of lens mounting supports adjustably mounted therein in a fashion such that a two-power and a four-power lens are disposed on opposite sides thereof and the interpupillary distance between the lenses can be simultaneously adjusted. A pair of legs are adjustably affixed to the body portion, to permit the height of the stereoscope to be easily and quickly adjusted to a two-power, a four-power and a collapsed storage position.

---

This application is a continuation in part of co-pending U.S. patent application, Ser. No. 569,516, filed Aug. 1, 1966, now abandoned.

This invention relates in general to optical instruments and in particular, to improved stereoscopes. More particularly, the invention relates to improved multi-powered stereoscopes.

Stereoscopes are used for various tasks, one of which is the review and study of aerial reconnaissance photographs. The photographs normally are reviewed with a two-power stereoscope, and if a particular area is found to be of interest, it is examined with a four-power stereoscopes. Stereoscopes having both two and four-power capabilities are desirable. Many stereoscopes of the two and four-power type are available, however, there are few stereoscopes which are multi-powered. The available multi-power stereoscopes are generally unsatisfactory in that they lack accurate focal length adjustment, adequate interpupillary adjustment, and are not compact when out of use. The personnel reviewing and studying aerial reconnaissance photographs therefore normally use two different stereoscopes.

Accordingly, it is an object of the present invention to provide an improved multi-power stereoscope.

A more specific object is to provide an improved multi-power stereoscope which is easily and quickly adjusted to provide either two-power or four-power magnification.

Another object is to provide an improved multi-power stereoscope which is constructed in a fashion such that the interpupillary distance between the two and four-power lenses can be adjusted simultaneously. In this respect, it is further contemplated that each of the two and four-power lenses can be both independently adjusted with respect to one another and with the interpupillary distance between the lenses.

Still another object of the invention is to provide improved multi-power stereoscopes which have positive locking leg adjustments for two and four-power magnification, with identical adjusting techniques.

Still another object is to provide improved multi-power stereoscopes having a pair of legs which are retractable to form a low silhouette, so that the stereoscopes can be compactly folded for storage.

A still further object is to provide improved multi-power stereoscopes which are designed and constructed with parts which are duplicates of one another so that molding or stamping costs, and hence the costs of the stereoscopes, are substantially reduced. In this respect,

2 it is further contemplated that stability and strength of the stereoscopes are substantially improved, and that the effort, time and skill required to assemble the stereoscopes are likewise substantially reduced.

A still further object is to provide improved multi-power stereoscopes which are adapted to use existing lenses so that the cost of converting to the stereoscopes of the present invention is substantially reduced.

Still another object is to provide improved multi-power stereoscopes which will not scratch the aerial reconnaissance photographs.

A still further object is to provide improved multi-power stereoscopes which are of sturdy construction and require little, in any, maintenance.

Other objects of the invention will in part be obvious and will in part appear hereinafter.

The above objectives are accomplished with a multi-power stereoscope which includes, generally, a body portion, a pair of lens mounting supports, each of which is adjustably retained within the body and which is adapted to adjustably support a pair of lenses, a head rest, and a pair of legs each of which is adjustably affixed to the body portion. The head rest is affixed to the body portion and the latter includes an elongated slot in which the pair of lens mounting supports are retained. The lens mounting supports each carry a two-power and a four-power lens, and the lens mounting supports are adjustably affixed within the elongated slot of the body portion so that the two and four-power lenses are on opposite sides of the body portion. Adjusting means are affixed to each of the lens mounting supports, for one handed adjustment if the interpupillary distance between the lenses. The lenses also are each independently adjustable, for focusing them, as required. The pair of legs each have an offset locking member which is engageable within detents formed in the body portion, to permit the height of the stereoscope to be easily and quickly adjusted to a two-power, a four-power and a collapsed storage position.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 4 is an end plan view of the multi-power stereoscope of FIG. 1;

FIGS. 5 and 6 are partial and end side views, respectively, of the legs of the multi-power stereoscope, illustrating the offset locking members protruding therefrom;

FIGS. 7 and 8 are partial side views of the body portion of the multi-power stereoscope of FIG. 1, illustrating the detents formed therein for receiving the offset locking members on the legs and further illustrating the legs, in phantom, in a locked position for two-power and four-power magnification, respectively;

FIG. 9 is a partial exploded perspective view of the one end of the body portion of the multi-power stereoscope of FIG. 1, illustrating the manner in which the legs are adjustably affixed thereto;

FIG. 10 is a sectional view on a reduced scale taken substantially along the inner face between the members forming the body portion, illustrating the interpupillary adjusting means for the lens mounting supports adjustably retained within the body portion, and further illustrating the legs in their collapsed position for storage;

FIG. 11 is a partial sectional view illustrating the manner in which the head rest is fixedly retained between the two members forming the body portion;

Figure 16:
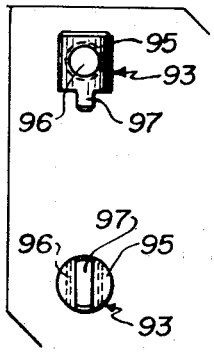
Figure 17:
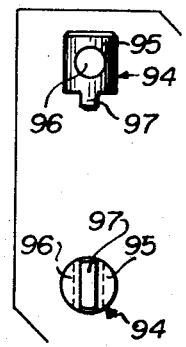
Figure 18:
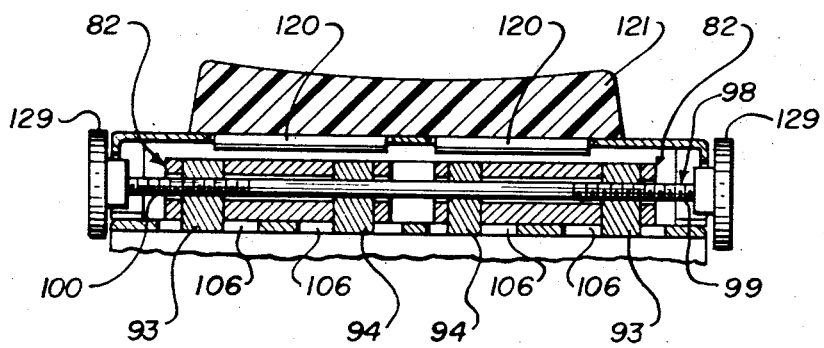

FIGS. 16 and 17 each are side and bottom plan views of a pair of locating keys used to affix and to align the lens mounting supports with the body portion of the stereoscope;

FIG. 18 is a sectional view on a reduced scale, substantially like FIG. 10, illustrating the manner in which the lens mounting supports are adjustably affixed within the body portion and further illustrating the interpupillary adjustment means for the lens mounting supports;

FIG. 19 is an exploded perspective view generally illustrating the construction of the stereoscope of the second embodiment of the invention; and FIG. 20 is a partial sectional view, generally illustrating the manner in which the legs are adjustably locked in a selected position.

Similar reference characters refer to similar parts throughout the several views of the drawings.

Referring now to the drawings, there is illustrated a multi-power stereoscope 10 exemplary of a first embodiment of the invention having a body portion 12, a pair of lens mounting supports 14 and 15 each of which has a two-power lens 16 and a four-power lens 17 adjustably retained therein on opposite sides of the body portion 12, a head rest 18 fixedly secured atop the body portion 12, and a pair of legs 19 and 20 adjustably affixed to the body portion, for positionally adjusting the height of the stereoscope 10, for two-power and four-power magnification, in a manner described more fully below.

As can be best seen in FIG. 12, the body portion 12 is formed of two identical body members 12a and 12b which are substantially rectangular in shape and have elongated slots 22 which extend substantially across the entire width thereof. Integrally formed with each of the body members 12a and 12b are a pair of triangular shaped strut supports 24 each of which terminates in a generally circular shaped detent member 25. The detent members 25 are positioned at the opposite ends of the body members 12a and 12b, and have apertures 26 formed therein for receiving pivot pins 27 (FIG. 10) for adjustably affixing the legs 19 and 20 to the body portion 12. The detent members 25 also have a pair of detent slots 28 and 29 (best seen in FIGS. 7 and 8) which are angularly disposed with respect to one another and which extend across the diameter of the detent members 25.

The lens mounting supports 14 and 15 also are each identical in construction and are each substantially rectangular in shape. Two of the corners 28 and 29 of each of the lens mounting supports 14 and 15 are substantially rounded so as to provide nose bridge slots 30 between them. The lens mounting supports 14 and 15 each also has a pair of threaded lens apertures 32 and 34, for threadably and adjustably receiving the two-power lenses 16 and the four-power lenses 17, respectively. The threaded lens apertures 32 and 34 are preferably adapted to threadably and adjustably receive the standard two and four-power lenses presently generally used on the existing individual two and four-power stereoscopes. Accordingly, when converting from the stereoscopes presently used to the multi-power stereoscope 10 of the present invention, it is not necessary to purchase the two and four-power lenses 16 and 17. The available lenses used with the two and four-power stereoscopes can be removed from them and threaded into the lens mounting supports 14 and 15. The cost of converting is therefore substantially reduced.

The lens mounting supports 14 and 15 each also have a substantially rectangular shaped upstanding guide 35 transversely disposed across and centrally between the threaded lens apertures 32 and 34. A substantially U-shaped elongated slot 36 is formed in the opposite side of each of the lens mounting supports 14 and 15, beneath the guides 35. A pair of slots 37 and 38 (FIG. 11) are formed in the side walls of the elongated slots 36, for receiving a threaded nut 39. The threaded nuts in each of the lens mounting supports 14 and 15 have a threaded shaft 40 extended through them. The threaded portions 42 and 44 of the threaded shaft 40 are right-handed and left-handed threads respectively, so that upon rotation of the shaft 40, the lens mounting supports 14 and 15 are moved longitudinally within the elongated slot 22 formed in the body portion 12, for adjusting the interpupillary distance between the lenses 16 and 17. The opposite ends of the body members 12a and 12b each have semi-circular shaped cutouts 45 therein for forming a circular shaped bearing support surface for the reduced diameter portion 46 of a pair of knobs 47 fixedly secured to the opposite ends of the shaft 40 for rotating it.

In assembling the above described portion of the multi-power stereoscope 10, the lens mounting structures 14 and 15 are extended through the elongated slot 22 formed in the body member 12a or 12b and, after the nuts 39 have been threaded onto the shaft 40 and the knobs 47 affixed to the opposite ends of the shaft 40, the nuts 39 are positioned within the slots 37 and 38 and the shaft 40 adjusted so that the reduced diameter portions 48 of the knobs 47 are seated within the cutouts 45. Next, the opposite one of the body members 12a or 12b is extended over the opposite side of the lens mounting supports 14 and 15, in an abutting relationship with the first one of the two body members. It may be noted that each of the body members 12a and 12b also has a small recessed cavity 48 therein in which the guides 35 of the lens mounting supports 14 and 15 are slidably retained. The body members 12a and 12b are fixedly secured to one another, by extending fastening means such as threaded screws or the like through apertures 49 formed therein. It can be seen that this portion of the multi-power stereoscope 10 can be easily and quickly assembled and, furthermore, since the body members 12a and 12b and the lens mounting supports 14 and 15 are identical in construction, the cost of these members as well as the stereoscope 10 is substantially reduced since all of these members can be molded, in only two molds.

As can be seen in FIGS. 10 and 11, the head rest 18 substantially corresponds in width to the width of the body portion 12, and has a smaller in width portion 51 which is adapted to seat between and within a rectangular shaped pocket 50 formed between the body members 12a and 12b, by means of the cutouts 52 formed in the top wall 54 of each of the lens mounting supportings 14 and 15. The head rest 18 is fixedly retained within the pocket 50 by means of the fastener means extended through the apertures 49 in the top wall 54 of the lens mounting supports 14 and 15, as illustrated in FIG. 11.

Figure 3:
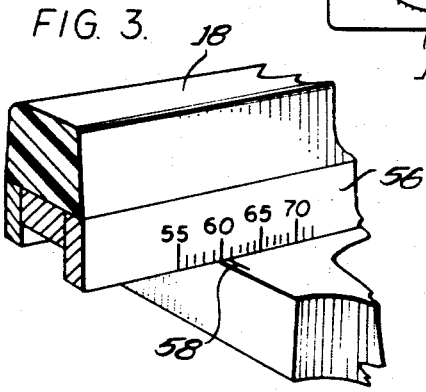
FIG. 3 is a partial perspective view, illustrating the interpupillary adjustment scale formed on the body portion thereof.

One or both of the body members 12a and 12b forming the body portion 12 has an interpupillary scale 56 (FIG. 3) provided on it and the lens mounting supports 14 and 15 have a reference index 58. In assembling the lens mounting supports 14 and 15 and the body members 12a and 12b, care must be taken so that the initial position of the lens mounting supports 14 and 15 within the elongated slot 22 within the body portion 12 is such that the reference index, or indexes 57, on the lens mounting supports 14 and 15 is in proper alignment with the calibrations on the interpupillary scale 56. The reference indexes 57 and the interpupillary scales 56 function as ready references for fast adjustment of the interpupillary distance between the lens mounting supports 14 and 15 (or the lenses 16 and 17).

The legs 19 and 20 for the multi-power stereoscope 10 are both identical in construction and have substantially U-shaped leg members 19a, 19b and 20a, 20b, respectively. The upper ends of each of the legs 19 and 20 terminate with a pair of upstanding pivot supports 58 and 59 which are spaced apart so as to receive the detent members 25 of the body members 12a and 12b between them. Each of the pivot supports 58 and 59 have an aperture 60 formed in them (FIGS. 5 and 6), and one of them, in the illustrated case (pivot support 58) has a pair of offset locking members 61 and 62 which are adapted to be received within the detents 28 and 29 formed in the detent members 25. In affixing the legs 19 and 20 to the body member 12, the pivot pin 27 is extended through the apertures 60 formed in the pivot supports 58 and 59 and through the apertures 26 formed in the detent members 25, as illustrated in FIG. 9. A spring 64 is affixed about the pivot pin 27, between the pivot support 58 and the detent member 25, and a collar 66 is affixed to the opposite end of tthe pivot pin 27 by means of fastening means such as the threaded screw 68 extended through aperture 69 formed in the collar 66. When assembled, the spring 64 forcibly urges the pivot support 59 in abutting relationship with the detent member 25, as illustrated in FIG. 4. To adjustably position the legs 19 and 20, the pivot support 58 is forcibly urged against the spring 64 so that the locking members 61 and 62 on the pivot support 59 can be releasably engaged from the detents 28 or 29 on the detent member 25 and the legs pivotally adjusted to its collapsed position or to a position with the locking members 61 and 62 engaged within the detents 28 or 29 formed in the detent member 25.

Figure 1:
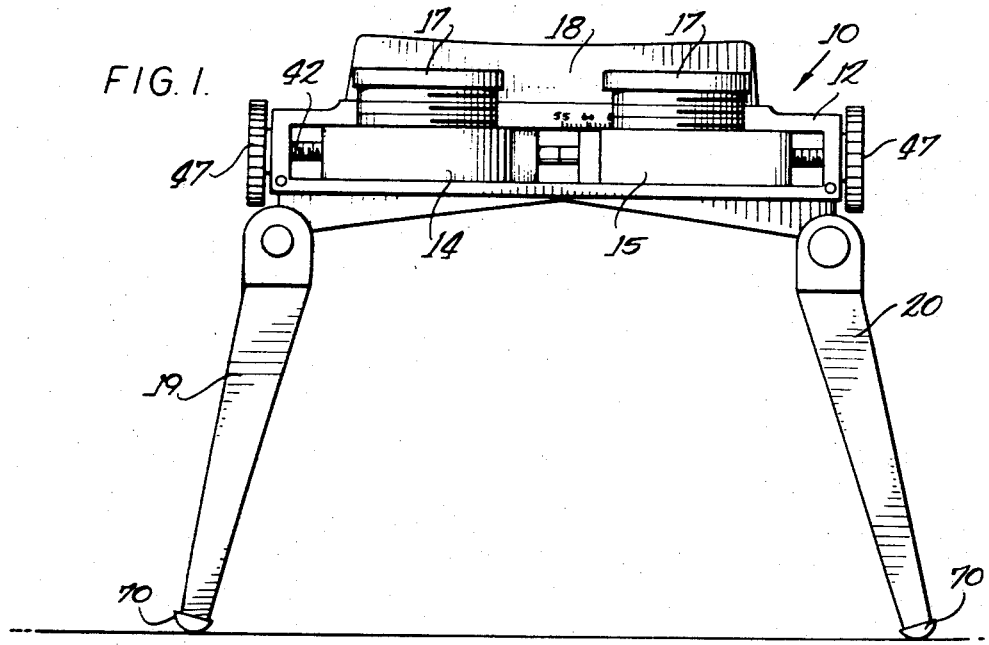
FIG. 1 is a front plan view of a multi-power stereoscope exemplary of the invention, illlustrating the same with its legs locked in position for two-power magnification.
Figure 2:
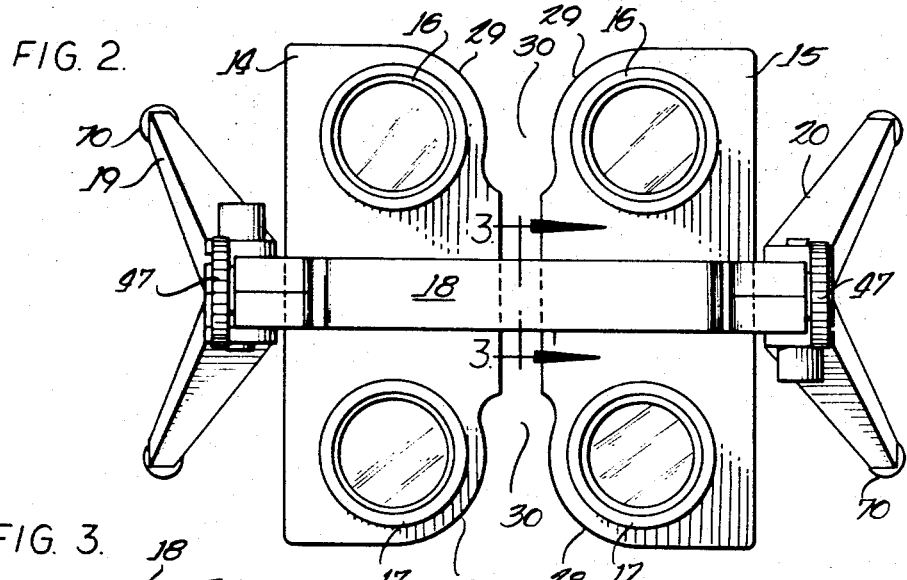
FIG. 2 is a top plan view of the multi-power stereoscope of FIG. 1.

In using the multi-power stereoscope 10, the legs 19 and 20 are first adjustably positioned, in the manner described above, for two-power or four-power magnification. As previously indicated, aerial reconnaissance photographs and the like are normally first generally reviewed with two-power magnification, and if a particular area of interest is located, that area is more closely examined using four-power magnification. With the stereoscope of the present invention, for two-power magnification, the legs 19 and 20 are first positioned to lockingly engage the locking member 61 and 62 within the detents 29 in the detent members 25, as illustrated in FIG. 7. When locked in this position, the legs 19 and 20 will appear as illustrated in FIG. 1. Next, the interpupillary distance between the lenses 16 is adjusted by turning one of the knobs 47 affixed to the ends of the shaft 40, with either the right or the left hand, as desired. It may be noted that upon adjusting the interpupillary distance between the lenses 16, the interpupillary distance between the lenses 17 also is automatically and simultaneously adjusted. Accordingly, upon switching to four-power magnification, it is not necessary to readjust the interpupillary distance for the lenses 17. Each of the individual lenses 16 is adjusted by threading them within the threaded apertures 32 formed in the lens mounting supports 14 and 15.

If it is desired to switch from two-power to four-power magnification, the legs 19 and 20 are adjusted to forcibly urge the pivot support 58 against the spring 64 to release the locking members 61 and 62 from the detent 29 formed in the detent member 25. The legs 19 and 20 are then rotated and released to lockingly engage the locking members 61 and 62 within the detents 28 in the detent members 25, as illustrated in FIG. 8. It may be noted that this will substantially lower the height of the body portion 12, since the legs 19 and 20 are angularly spread apart a substantially greater distnce then they are when the locking members 61 and 62 are engaged within the detents 29 of the detent members 25. Upon adjustably positioning the legs 19 and 20 in the described manner, the lenses 17 are then used to more closely examine the aerial reconnaissance photograph. As indicated above, the interpupillary distance between the lenses 17 is pre-adjusted, upon adjusting the interpupillary distance between the lenses 16.

When storing the stereoscope 10, the legs 19 and 20 are manipulated, in the described manner, to fold them in overlapping relationship beneath the body portion 12, as illustrated in FIG. 10. It may be noted that the legs 19 and 20 are proportioned and oriented by the taper and width thereof so that they fold completely beneath the body portion to a position wherein the stereoscope rests on the detent members 25 on the opposite ends of the body portion. The overall height of the collapsed or folded stereoscope is therefore determined by the distance from the lower edge of the detent members 25 to the tops of the lenses 16 and 17. The stereoscope accordingly provides a very low silhouette, for compact storage.

Feet 70 of Teflon, rubber or similar material are affixed to each of the legs 19a, 19b, 20a, and 20b to avoid scratching the reconnaissance photographs and the like.

It can be seen from the above description of the multipower stereoscope 10 that it can be relatively inexpensively fabricated and assembled because of its design. In particular, the body portion 12 is constructed of two identically shaped body members 12a and 12b and the lens mounting supports 14 and 15 and the legs 19 and 20 are likewise identical in shape so that all of these elements thereof can be formed or molded in but three molds. Accordingly, the number and therefore costs of molding dies and the like is at a minimum. Assembly is easily and quickly accomplished, by extending the lens mounting supports 14 and 15 through the body members 12a and 12b and affixing them together, with the forehead support 18 therebetween, in the manner described. The legs 19 and 20 are next affixed to the body portion 12, by means of the pivot pins 27, to complete the assembly. The lens 16 and 17 may be provided, or existing lenses can be used, to convert operation from individual stereoscopes of a single power to the multi-power operation provided by the stereoscope 10. Adjustment of the interpupillary distance between the two pairs of different powered lenses 16 and 17 is automatically and simultaneously accomplished, and a ready reference as to the desired interpupillary distance is provided, by means of an interpupillary distance scale. The multi-power stereoscope 10 therefore has numerous advantages over existing multi-power or single power stereoscopes presently available.

Referring now to FIGS. 13–20, there is illustrated another multi-power stereoscope which is generally like the stereoscope 10, however, its body portion 80 and its legs 81 are formed by stamping them from, for example, sheet stainless steel. Accordingly, with this construction, the cost of the stereoscope can be substantially reduced. Furthermore, breakage is inhibited and the stereoscope is stronger in service. The stereoscope of FIG. 13–20 also has a new detent construction which is positive in operation and requires no independent construction.

Figure 13:
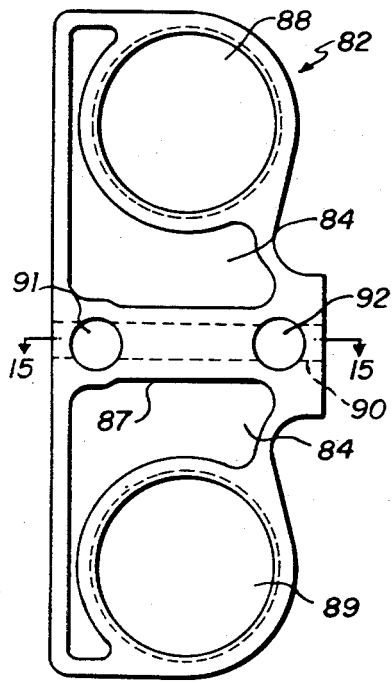
FIG. 13 is a bottom plan view of a lens mounting support which is fabricated in accordance with a second embodiment of the invention.
Figure 14:
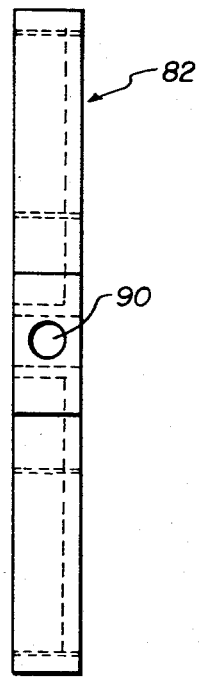
FIG. 14 is a side plan view of the lens mounting support of FIG. 13.
Figure 15:
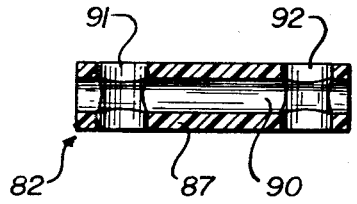
FIG. 15 is a sectional view taken along lines 15—15 of FIG. 13.

More specifically, the multi-power stereoscope illustrated in FIGS. 13–20 includes a pair of lens mounting supports 82 which are identical in construction and are cast of aluminum. The lens mounting supports thereafter are provided with a black anodize finish. One of these lens mounting supports 82 is shown in FIGS. 13–15, and it can be seen that they have generally the same configuration as the lens mounting supports 14 and 15. The lens mounting supports 82, however, have cored areas 84 and 85 which substantially reduce the weight thereof, by providing wall thicknesses of approximately ⅛ inch instead of the solid construction, as in the case of the lens mounting supports 14 and 15. Also, the lens mounting supports 82 have a web portion 87 which is centrally disposed between the lens receiving apertures 88 and 89 provided in them and which has a shaft receiving bore 90 extending lengthwise through it. A pair of locating key apertures 91 and 92 for receiving a pair of locating keys 93 and 94 (FIGS. 16 and 17) also extend transversely through the web portion 87 and intersect the shaft receiving bore 90, as can be best seen in FIG. 15.

The locating keys 93 and 94 are identical in construction except that the locating key 93 has its aperture 96 threaded, for reasons set forth below. These locating keys 93 and 94 each have a cylindrical-shaped head portion 95 and a generally rectangular-shaped key 97 on one end thereof which extends diametrically across it. An aperture 96 provided in the head portion 95 extends diametrically through it, in the same direction as the length of the key 97 and, as indicated above, the aperture in the locating key 93 is threaded. In assembling the stereoscope, each of the lens mounting supports 82 have one locating key 93 and one locating key 94 seated within the locating key apertures 91 and 92, respectively, and a shaft 98 (FIG. 18), having right-hand and left-hand threaded portions 99 and 100 on it, is slidably extended through the locating keys 94 and threadedly extended through the locating keys 93 to positionally retain and align the lens mounting supports 82 within the body portion 80 of the stereoscope, as explained more fully below.

The body portion 80, as can be best seen in FIG. 19, is formed of a frame 101 and a lens holder cap 102, each of which is stamped from, for example, sheet stainless steel and is finished black. The frame 101 is generally U-shaped in cross-section and includes a flat top wall 103 and two side walls 104 and 105. The top wall 103 has four elongated slots 106 formed in it, for slidably receiving therein the keys 97 formed on the locating keys 93 and 94, and four apertures 107 for receiving fastener means such as threaded screws 108 for affixing the lens holder cap 102 to the frame 101. The side wall 105 has a pair of generally semi-circular shaped ears 109 formed on it, in which there are provided pivot shaft apertures 110. The side wall 104 is of similar construction, however, the pivot shaft apertures 110' formed in it are slightly smaller in diameter than the apertures 110 in the side wall 105, for reasons set forth below. The side wall 105 also has two locking pin apertures 111 and 112 formed in it, in predetermined positions, at each of its opposite ends, which function in conjunction with locking pins 128 (FIGS. 19 and 20) provided on the legs 81 to position the stereoscope, as explained below.

The lens holder cap 102 also is generally U-shaped in cross-section and has a flat top wall 114 and two side walls 115 and 116. The ends of the top wall 114 preferably are folded and fixedly secured between the side walls 115 and 116, as illustrated, to brace the side walls against lateral movement or bending. The top wall 114 also has a pair of elongated slots 117 and 118 formed in it, for receiving locking tabs 120 formed on the head rest 121 to affix the latter to the lens holder cap 102, as described more fully below. Each of the side walls 115 and 116 is cut-away so as to provide a pair of legs 122 at each of the opposite ends of the lens holder cap 102, and to provide a slot defined by the edges of the legs 122, the edges 123 on respective ones of the side walls and the top wall 103 of the frame 101 when the lens holder cap is affixed to the frame, for receiving the lens mounting supports 82. The ends of each of the legs 122 are folded to provide a flange 124 which will seat atop the top wall 103 of the frame 101. The flanges 124 also are positioned and have apertures 125 in them for receiving the ends of the fastener means such as the threaded screws 140 extended through the apertures 107, to affix the lens holder cap atop the frame 101.

The head rest 121 is generally like the head rest 18, however, it has two pairs of locking tabs 120 provided on its underside. These locking tabs are resilient and adapted to be forcibly urged through the elongated slots 117 and 118, to lockingly affix the head rest 121 to the lens holder cap 102.

The lens mounting supports 82, the frame 101, the lens holder cap 102 and the head rest 121 are assembled as follows. The locking keys 93 and 94 are seated within the locking key apertures 91 and 92, respectively, formed in the lens mounting supports 82. The shaft 98 next is slidably extended through the shaft receiving apertures 90 in the lens mounting supports and the apertures 96 formed in the locking keys 94, and threadedly extended through the threaded apertures 96 in the locking keys 93, as can be best seen in FIG. 18. An adjustment knob 129 is then affixed to each of the opposite ends of the shaft 98. The lens mounting supports 82 then are seated atop the frame 101, with the key portions 97 of the locking keys 93 and 94 slidably engaged within respective ones of the elongated slots 106 formed in the top wall 103 of the frame. At this time, a check should be made to determine that the initial positioning of the lens mounting supports 82 is such that the reference index, or indexes 137, on them is in proper alignment with the calibrations on the interpupillary scale 138. As in the case of the stereoscope 10, these reference indexes 137 and the interpupillary scale 138 function as a ready reference for fast adjustment of the interpupillary distance between the lens mounting supports 82.

The lens mounting supports 82 are positionally affixed atop the frame 101 in the above described fashion, by next fixedly securing the lens holder cap 102 atop the frame 101 by extending the threaded screws 140 through the apertures 107 in the frame and into the apertures 125 formed in the flange 124 of the legs 122. Thereafter, the head rest 121 is affixed to the lens holder cap 102, by forcibly urging the locking tabs 120 thereon, through respective ones of the slots 117 in the lens holder cap. It can therefore be seen that this portion of the stereoscope can be easily and quickly assembled.

The legs 81 for the stereoscope of FIGS. 13–20 are generally of the same shape as the legs 19 and 20 of the stereoscope 10, however, as indicated above, they are stamped from, for example, sheet stainless steel. A pair of generally L-shaped pivot flanges 141 and 142 are integrally formed at the top end of the legs 81 and are spaced apart so as to freely receive the ears 109 of the frame 101 between them, in a manner described more fully below. These pivot flanges 141 and 142 each have apertures 143 formed in them, for receiving the opposite ends of a pivot shaft 126. One of the pivot flanges 141 and 142 on respective ones of the legs 81, depending upon whether it is used as a right-hand or a left-hand leg, also has the locking pin 128 fixedly secured to it, in a position such as to releasably engage within the locking pin apertures 111 and 112 in the frame 101, to adjust the height of the stereoscope for two-power or four-power magnification.

The legs 81 are pivotally affixed to the frame 101 of the sterescope, by first extending a spacer 130 through the pivot shaft aperture 110 and seating a reduced diameter portion 131 on its one end in the pivot shaft aperture 110', as can be best seen in FIG. 20. The spacers 130 can be fixedly secured therein, by hammering the ends thereof so that they slightly overlap on the frame 101. These spacers have bores 132 extending through them for receiving the pivot shafts 126, and the one end of each of the spacers also has a spring receiving cavity 133 formed in it, concentrically about the bore 132. A spring 134 is placed over the end of the pivot shaft 126 and seated within the spring receiving cavity 133, as can be best seen in FIG. 20, so that it bears against the pivot flange 141, or 142, of the leg 81 and forcibly urges the pivot flange 142, or 141, against the frame 101. The pivot shafts 126 are fixed within the spacers 130 and to the frame 101, by means of C-rings 136 which are lockingly engaged within annular locking grooves 135 formed in their opposite ends. To adjustably position the legs 81, the pivot flanges 141, or 142, are forcibly urged against the springs 134 so that the locking pins 128 can be releasably engaged from the locking pin apertures 111, or 112, on the frame 101. The legs then can be pivotally adjusted to a collapsed position, or to a position with the locking pins 128 engaged within the locking pin apertures 111, or 112, to position the stereoscope for two-power or four-power magnification.

The stereoscope is now fully assembled, except for threadedly affixing the two-power lenses 16 and the four-power lenses 17 within the lens receiving apertures 88 and 89 in the lens mounting supports 82.

It can be seen that the stereoscope of FIG. 13–20 can be relatively inexpensively manufactured and assembled. In particular, the body portion and the legs of the stereoscope can be fabricated, simply by stamping them. Also, the body portion is assembled using only four threaded screws, and the legs are affixed to the body portion using a pair of pivot pins, so that the assembly operation is extremely simple. Furthermore, it has all of the other advantageous features of the stereoscope 10.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A multi-power stereoscope comprising, in combination: a body portion having an elongated substantially rectangular-shaped slot formed in it; a pair of lens mounting support members each adjustably retaining at least two lenses of different powers, said pair of lens mounting support members being extended through and adjustably retained within said slot in said body portion with the lenses on the same side of said body portion forming a pair of lenses of the same power; adjustment means interconnecting said support members for adjusting the space between said lens mounting support members to thereby adjust the interpupillary distance between said pair of lenses; lockable and adjustable means located between said body portion and a pair of legs pivotally affixed respectively to said body portion at each end thereof, said pair of legs are lockably adjustable to a collapsed position for storage beneath said body portion and to intermediate positions to correspondingly position the body portion at a height which is operatively related to the powers of said lenses.

2. The multi-power stereoscope of claim 1 further including a forehead support extending substantially across the length of said body portion, said body portion having a forehead support cavity therein, and said forehead support having a portion thereof recessed and fixedly secured in said cavity.

3. The multi-power stereoscope of claim 1 further including an interpupillary scale on said body portion on at least one side thereof and a reference index on at least one of said lens mounting support members positioned so as to indicate on said interpupillary scale the interpupillary distance between said pair of correspondingly powered lenses.

4. A multi-power stereoscope comprising, in combination: a body portion having an elongated substantially rectangular-shaped slot formed in it, said body portion being formed of two identical body members which are reversed with respect to one another at their interface and affixed together, each of said body members having a cavity formed in them which define a guide slot when said body members are assembled, a pair of lens mounting support members each having an upstanding guide formed centrally thereof across its width, said pair of lens mounting support members being extended through and adjustably retained within said slot in said body portion with said upstanding guides thereon slidably disposed in said guide slot formed by said cavities in said body members, each of said lens mounting support memebrs adjustably retaining at least one lens of a different power on each of the opposite sides of said body portion, the two lenses adjustably retained within each of said pair of lens mounting support members on the same side of said body portion forming a pair of lenses of the same power, adjustment means interconnecting said lens mounting support members for adjusting the space between said lens mounting support members to thereby adjust the interpupillary distance between said pair of lenses; lockable and adjustable means located between said body portion and a pair of legs pivotally affixed respectively to said body portion at each end thereof, said pair of legs are lockably adjustable to a collapsed position beneath said body portion for storage and to intermediate positions to correspondingly position the body portion at a height which is operatively related to the powers of said lenses.

5. The multi-power stereoscope of claim 4 further including a detent member integrally formed on each of the opposite ends of said body member having at least a pair of detent slots therein, said pair of legs each being of identical construction and substantially U-shaped, a pair of integral flanges on each of said pair of pivoted legs for receiving said detent members between them, offset locking means protruding from one of said integral flanges which are selectively lockingly engageable in said pair of detent slots in said detent members; and a pivot pin extended through said detent members and said integral flanges for affixing said pair of legs to said body portion.

6. The multi-power steroscope of claim 5 further including a collar affixed to one end of each of said pivot pins and a spring affixed about each of said pivot pins and between said collar and one of said integral flanges for yieldably urging said locking means into said detent slots.

7. A multi-power stereoscope comprising, in combination: a body portion including a frame and a lens holder cap which are fixedly secured together and are formed to define a substantially rectangular-shaped slot between them, said frame having a top wall having a plurality of guide slots formed in it, a pair of lens mounting support members each having guide means affixed thereto, said lens mounting support members being extended through and adjustably retained within said slot in said body portion with said guide means slidably disposed in said guide slots, each of said lens mounting support members adjustably retaining at least one lens of a different power on each of the opposite sides of said body portion, the two lenses adjustably retained within said lens mounting support members on the same side of said body portion forming a pair of lenses of the same power; adjustment means interconnecting said lens mounting support members for adjusting the space between said lens mounting support members to thereby adjust the interpupillary distance between said pair of lenses; lockable and adjustable means located betwen said body portion and a pair of legs pivotally affixed respectively to said body portion at each end thereof, said pair of legs being lockably adjustable to a collapsed position beneath said body portion for stroage and to intermediate positions to correspondingly position the body portion at a height which is operatively related to the powers of said lenses.

8. The muli-power stereoscope of claim 7, wherein said frame is generally U-shaped in cross-section having a top wall and a pair of side walls, a pair of locking pin apertures in each of said side walls at each of its opposite ends which cooperate with a locking pin affixed to each of said legs to adjustably pivotally lock said legs in said intermediate positions, and wherein said lens holder cap is generally U-shaped in cross-section having a top wall and a pair of side walls, said pair of side walls being formed to define in conjunction with said top wall of said frame said slot for receiving and retaining therein said lens mounting support members.

9. The multi-power stereoscope of claim 7 wherein each of said lens mounting support members have a bore formed therein which extends centrally across its width, and a pair of locating key cavities which extend through the thickness thereof and intersect said bore, said guide means comprising a locating key having a threaded aperture and a locating key having an unthreaded aperture disposed in respective ones of said pair of locating key cavities, said adjustment means comprising a threaded screw having a first and a second portion thereon which is of right-hand and left-hand threads, respectively, said threaded screw being extended through said bore and said locating keys having an unthreaded aperture and threaded through said threaded apertures in the other ones of said locating keys whereby said lens mounting support members are positionally spaced apart when said threaded shaft is rotated, and a knob affixed to each end of said threaded shaft for rotating said shaft from either end thereof with one hand.

10. The multi-power stereoscope of claim 1, wherein each of said lenses adjustably retained by said lens mounting support members is independently adjustable to focus it.

References Cited
UNITED STATES PATENTS

| | | | |
|---|---|---|---|
| 1,785,448 | 12/1930 | Hugershoff | 350—145 |
| 2,178,324 | 10/1939 | King et al. | 350—137 |
| 2,229,424 | 1/1941 | Seely | 350—145 |
| 2,366,228 | 1/1945 | Abrams | 350—139 |
| 2,830,494 | 5/1958 | Bouners | 350—136 |
| 3,186,300 | 6/1965 | Littmann | 350—25 |
| 3,258,303 | 6/1966 | Silverstein | 350—145 |

DAVID SCHONBERG, *Primary Examiner.*

P. GILLIAM, *Assistant Examiner.*

U.S. Cl. X.R.

248—178; 350—111, 143, 82, 250, 255